United States Patent

Leonik, Jr.

[11] 4,031,355
[45] June 21, 1977

[54] MULTI-CHANNEL TEMPERATURE RESPONSIVE PROCESS CONTROL SYSTEM

[76] Inventor: Stephen A. Leonik, Jr., 160 Sunrise Drive, Woodside, Calif. 94062

[22] Filed: Mar. 31, 1975

[21] Appl. No.: 563,911

[52] U.S. Cl. ............................................. 219/502
[51] Int. Cl.² .......................................... H05B 1/02
[58] Field of Search ......................... 137/341, 386; 222/146 HE; 73/361; 219/483, 486, 490, 494, 497, 501, 502; 250/551

[56] References Cited

UNITED STATES PATENTS

| | | | |
|---|---|---|---|
| 3,016,930 | 1/1962 | Dziedziula et al. | 222/146 HE |
| 3,073,164 | 1/1963 | Rorden et al. | 73/361 |
| 3,216,623 | 11/1965 | Grundmann | 222/146 HE |
| 3,247,361 | 4/1966 | Woodley | 219/483 |
| 3,371,191 | 2/1968 | Seney | 219/497 X |
| 3,486,029 | 12/1969 | Barrett et al. | 250/551 |
| 3,553,429 | 1/1971 | Nelson | 219/497 |
| 3,560,712 | 2/1971 | Toohill | 219/483 |
| 3,811,601 | 5/1974 | Reighard et al. | 222/146 HE |

OTHER PUBLICATIONS

GE Solid State Relays 3/73.
IBM Tech. Discl. Bullet. vol. 13, No. 3 8/70.

*Primary Examiner*—J. V. Truhe
*Assistant Examiner*—Fred E. Bell

[57] ABSTRACT

A solid state multi-channel temperature responsive control system having thermocouples positioned to monitor the temperature at various process control locations. Each thermocouple generates an electrical sensor signal representing the monitored temperature at the corresponding control location. The sensor signal from each thermocouple is supplied to an associated channel of control circuitry which automatically compares the sensor signal with a manually adjustable set-point signal representing the desired temperature at the monitored control location. The sensor signal for any particular channel may be selectively displayed on a voltmeter calibrated in degrees of temperature, and the set-point signal for the selected channel may be displayed on the same meter to facilitate adjustment thereof. The comparison circuitry in each channel generates a difference signal reflecting variation of the monitored temperature from its set-point value. The difference signal controls an associated but electrically isolated switching circuit, to regulate the application of alternating current to a control means associated with the channel. In the disclosed embodiment such control means include electrothermal and electromechanical transducers. Provision is included for visual high/low condition alarm indication, thermocouple break protection and cold junction compensation.

24 Claims, 7 Drawing Figures

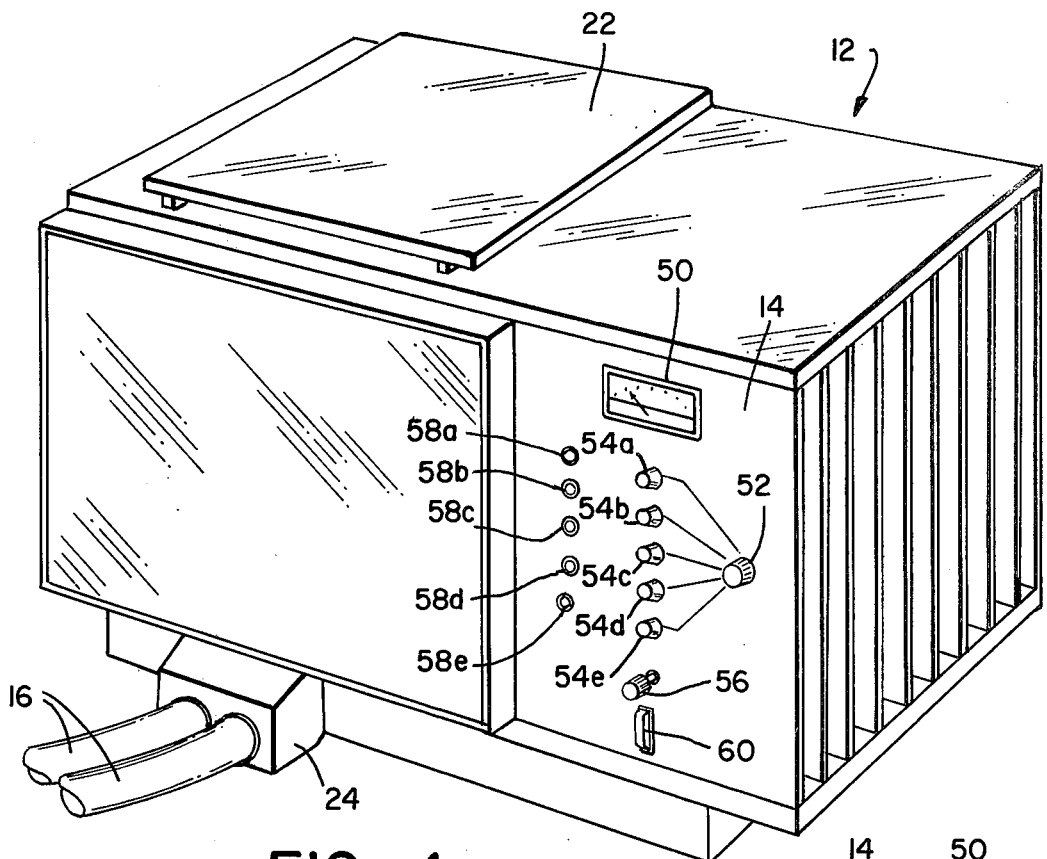
FIG_1
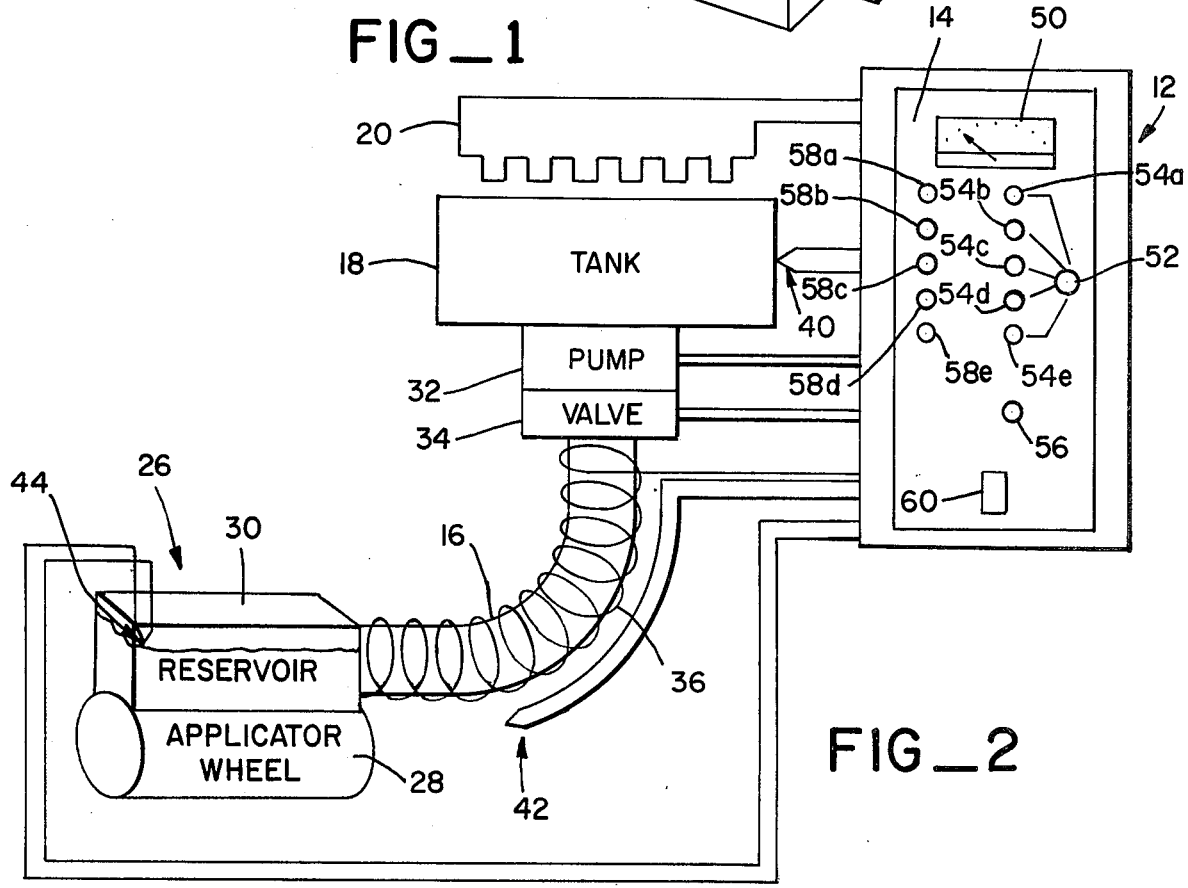
FIG_2

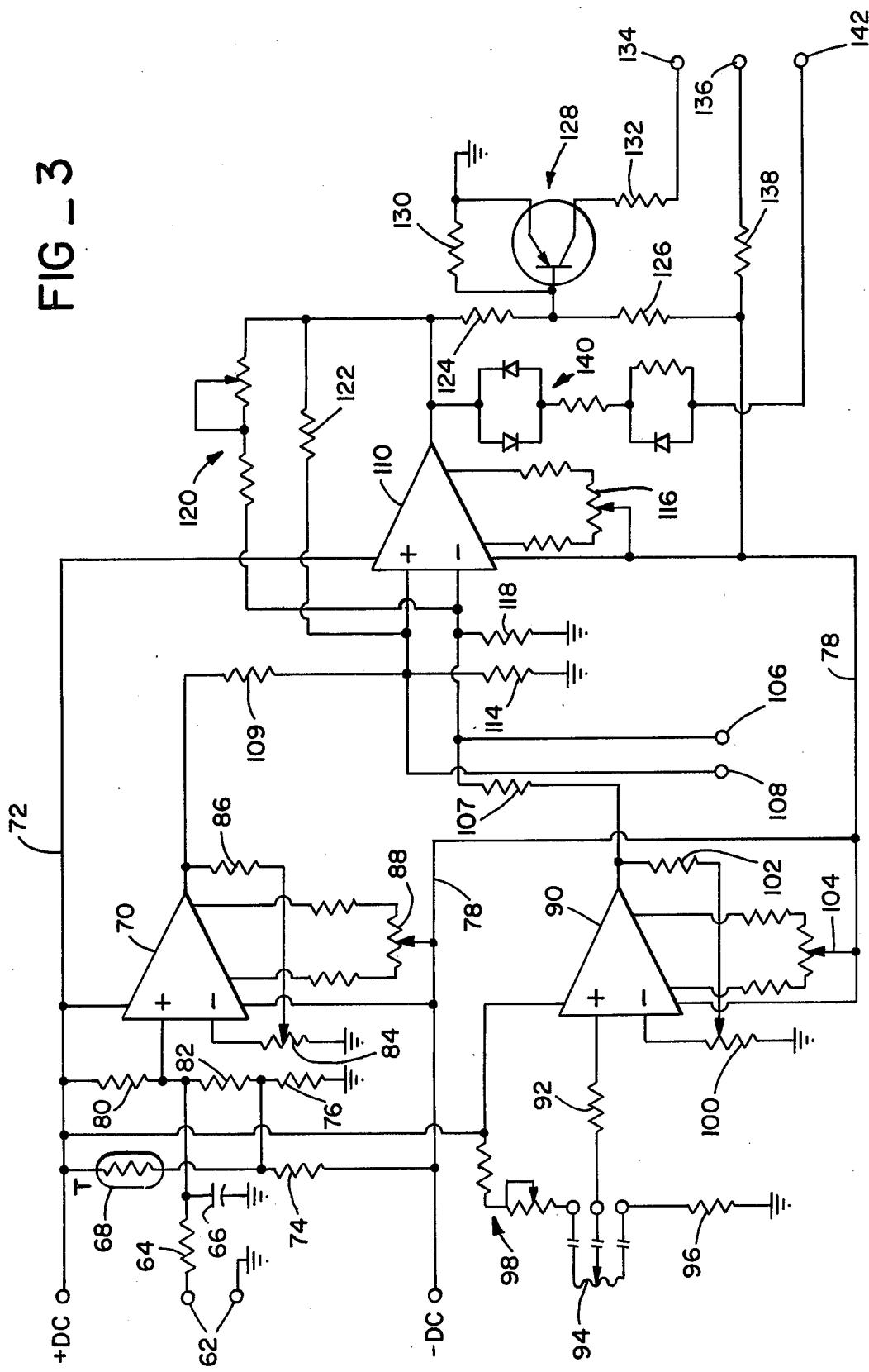
FIG_3

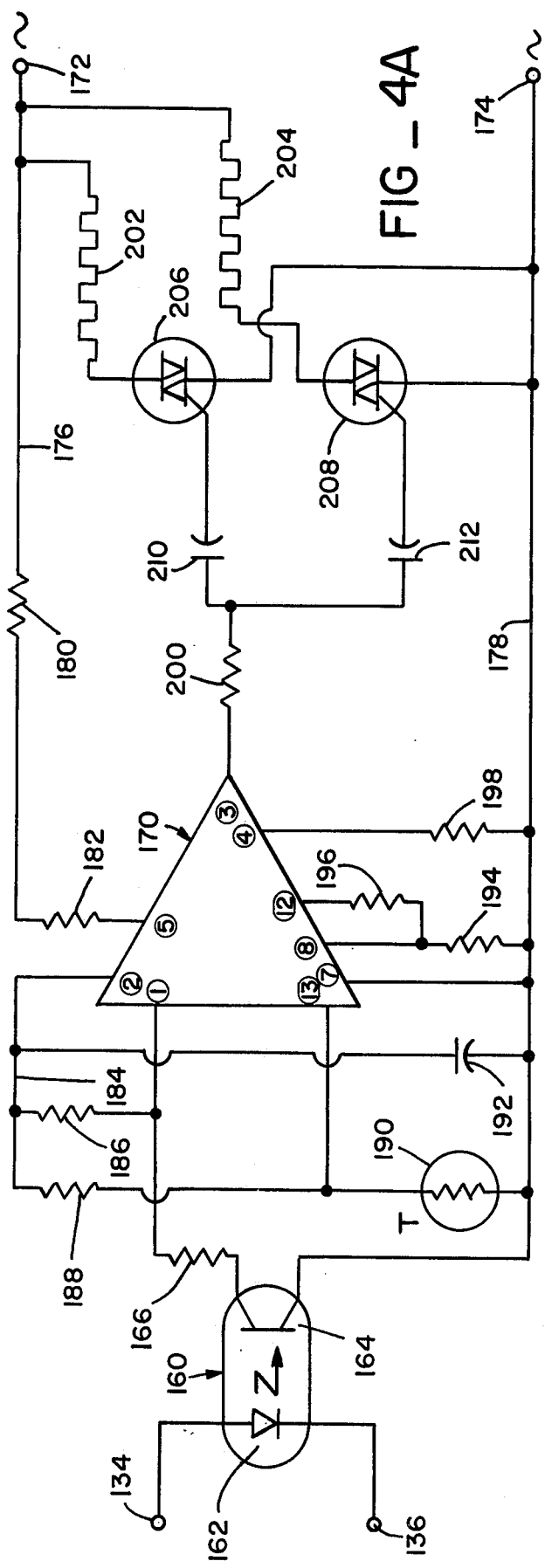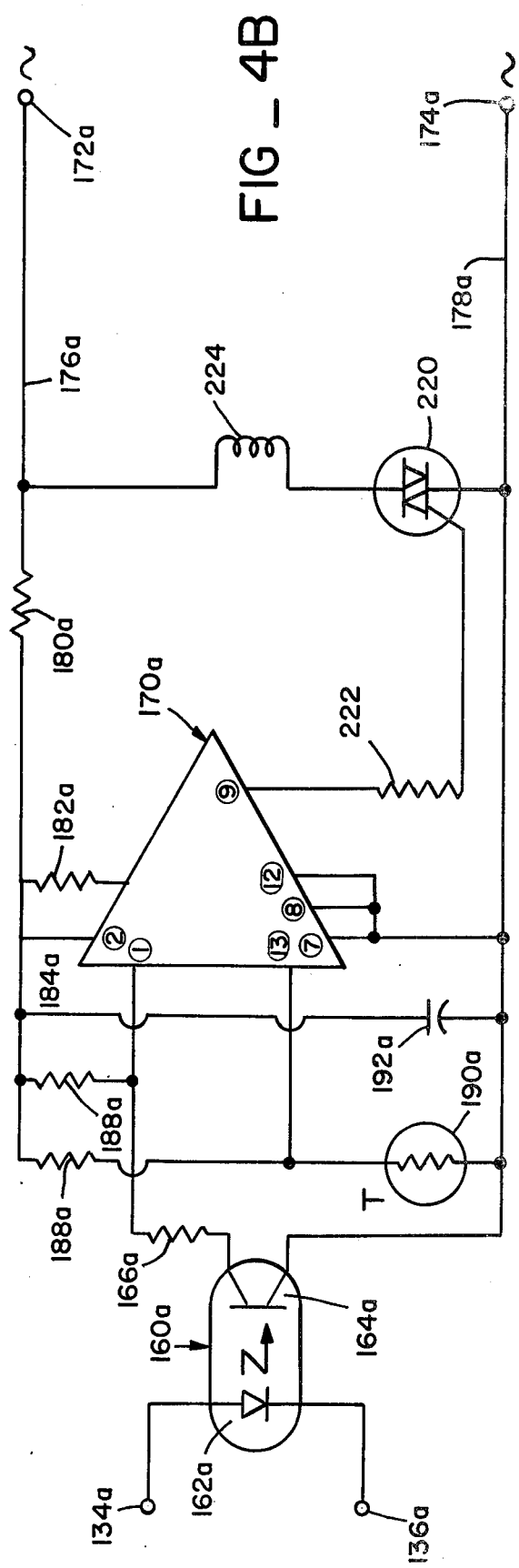

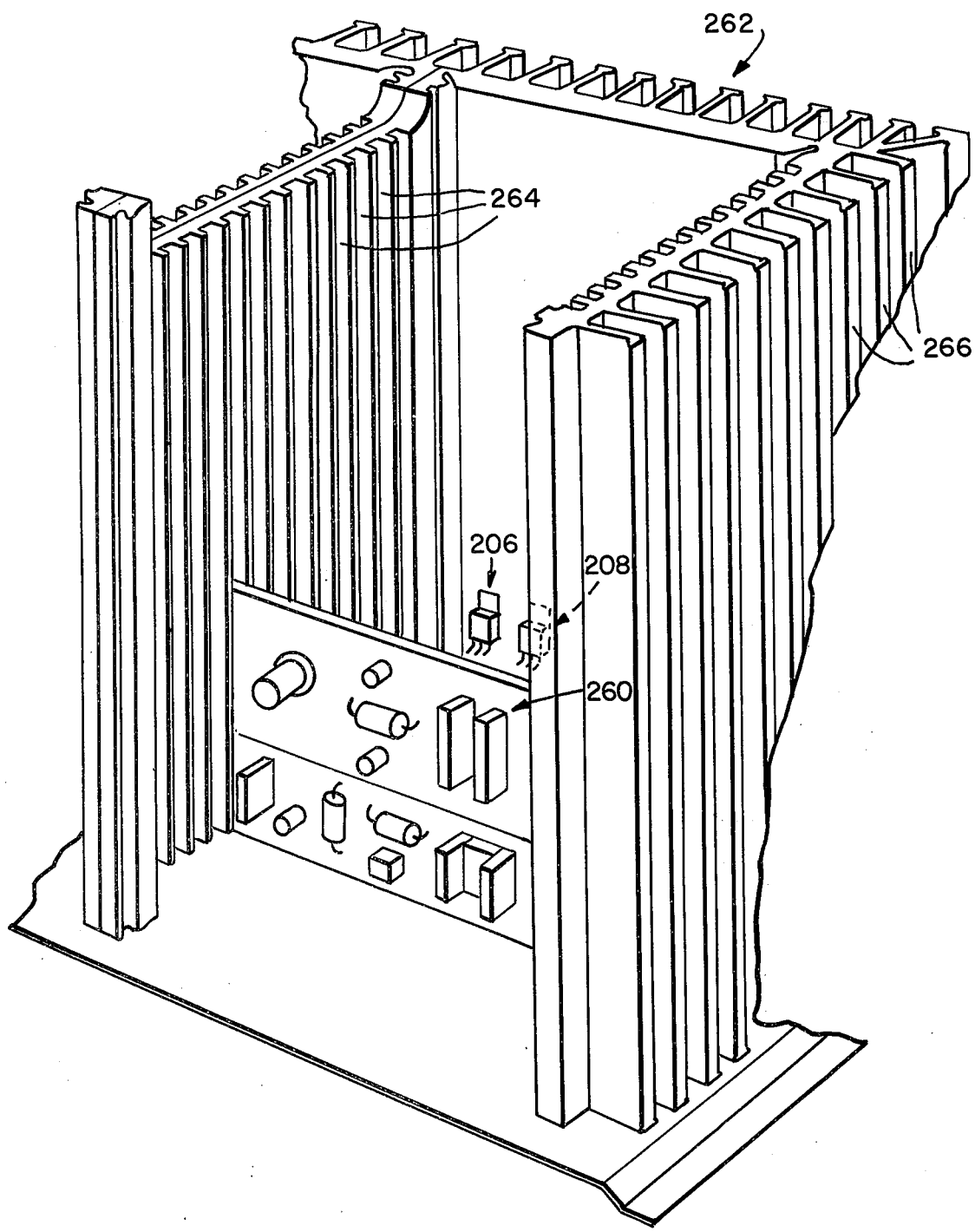
FIG_6

MULTI-CHANNEL TEMPERATURE RESPONSIVE PROCESS CONTROL SYSTEM

BACKGROUND OF THE INVENTION

The present invention relates to electronic control systems for the automatic regulation of electrical power supplied to various types of process control means in response to the variation of a sensed temperature from a preselected set-point value. The system is disclosed herein in connection with the automatic control of fluid temperature and fluid level in "hot melt" liquid adhesive applicator apparatus.

In the regulation of various process control parameters such as temperature, pressure, fluid level and the like, it is common to employ thermosensitive elements such as thermistors, bimetallic switches or hot bulbs at a number of locations to generate signals which are used to control the application of electrical power to various control means in the system. For example, control means such as heating elements may be used to supply thermal energy to fluid materials to maintain the temperature thereof within preset limits. Typically, the output signal of the temperature sensor is electronically processed and compared with another signal representing a preset or "set-point'" temperature level corresponding to the desired temperature at the monitored location. The difference between the sensed and set-point signals is used to control the application of electrical power to the heating element.

In the case of control means for maintaining the level of heated fluid at a particular position, the temperature sensor may be disposed above the surface of such a fluid contained within a reservoir. When the level of the heated fluid rises it contacts the sensor which generates a signal indicating an increased temperature at the control location. The sensor signal may then be used to control power switching circuitry to close a solenoid actuated fluid valve controlling the flow to the monitored control location.

In the area of the control of fluid temperature in "hot melt" liquid adhesive applicator apparatus, the temperature sensor commonly takes the form of a "hot bulb" or thermistor which produces a signal representative of adhesive temperature. This signal is electrically compared with a fixed signal representing the manufacturer's recommended temperature for the adhesive being used to produce a difference signal that controls a power supply operating heating elements disposed throughout the system.

Existing systems of this nature are generally quite inflexible and any individual system has only a limited power variation capability. In addition, such systems are quite bulky. Moreover, only limited accuracy of control has been possible with such systems. In contrast, the present invention provides a compact, high power, multipoint control system characterized by a high degree of accuracy, electromagnetic and electro-optical isolation, automatic cold junction compensation, thermocouple break protection, high/low visual alarms, and additional other highly advantageous features which will be more readily apparent after reading the following description with reference to the accompanying drawings.

SUMMARY OF THE INVENTION

The system of the present invention is herein described with respect to the control of the temperature and level of a heated fluid in a manufacturing or fabrication process. More particularly, the invention is disclosed in the context of the control of liquid adhesive temperature and level in a "hot melt" adhesive applicator device. The control system employs thermocouples positioned at various control locations to provide very accurate temperature sensing in the form of electrical sensor signals which are each compared in solid state circuitry with a manually adjustable electrical set-point signal representing the desired temperature at the corresponding control location. Both sensor signals and set point signals for any particular control channel may be selectively displayed on a meter which is calibrated in degrees of temperature. The difference signal from this comparison controls an electrically isolated switching device which regulates the supply of AC power to heating elements, solenoid actuated control valves, and other control means located at various positions within the thermal flow system to precisely and adjustably control fluid temperature, fluid level, or other physical conditions at these locations in response to the monitored temperature. The system includes automatic cold junction temperature compensation and correction of thermocouple response from ideal.

The utilization of thermocouples as sensors is highly advantageous over the use of more conventional thermistors for the same purpose. Thermocouple signals are very closely related to the thermocouple temperature and also by the proper choice of thermocouple metal a relatively linear response may be obtained. It is realized that the response curve of the thermocouple is not exactly a straight line but commonly has at least a slight bow, and in circumstances wherein very precise reading of temperature is required, the meter scale of the present invention may be varied from a linear relationship to compensate for this variation in thermocouple response curve. Commonly this adjustment of the meter scale is so slight as to be substantially unobservable to an operator.

DESCRIPTION OF THE DRAWINGS

FIG. 1 is a pictorial illustration of the exterior of a temperature responsive power control unit according to a preferred embodiment of the present invention;

FIG. 2 is a schematic representation of the control unit of FIG. 1 as used in conjunction with liquid adhesive dispensing apparatus and illustrating the electrical connections for temperature sensing and application of power to the control means;

FIG. 3 is an electrical schematic diagram of the control circuitry in one channel of the unit of FIG. 1;

FIG. 4A is an electrical schematic diagram of one channel of power switching circuitry responsive to the output of the circuit of FIG. 3 and utilized for controlling the application of power to resistive load control means such as heating elements;

FIG. 4B is an electrical schematic diagram of power switching circuitry which is similar to that of FIG. 4A but is utilized for controlling the application of power to inductive load control means such as a solenoid actuated control valve;

FIG. 6 is a partial perspective view of the physical mounting of printed circuit boards in the control unit of the present invention.

DESCRIPTION OF THE PREFERRED EMBODIMENT

Figure 5:
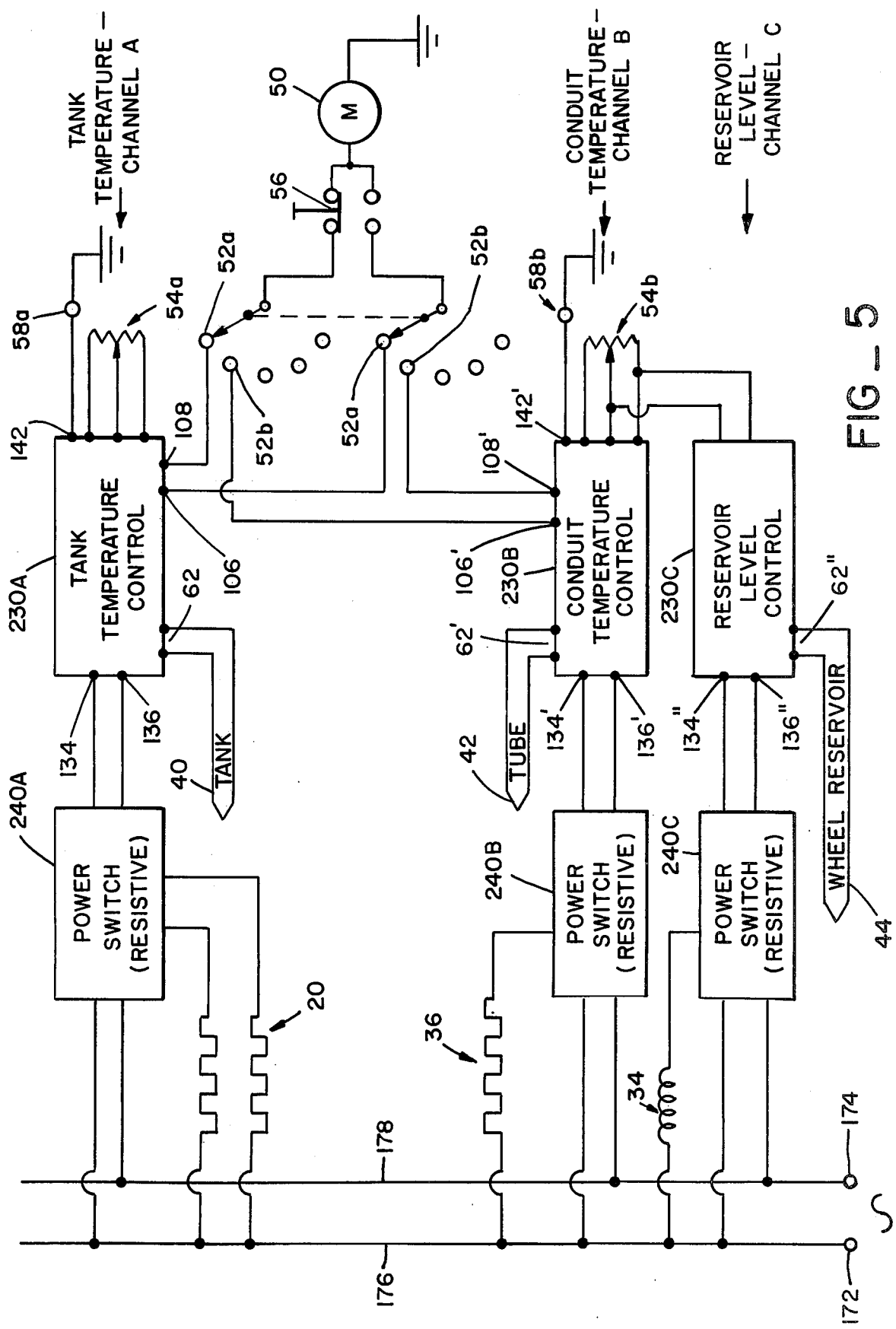
FIG. 5 is a block diagram of the control system of the present invention illustrating three control channels.

The control system of the present invention will be shown and described herein in the context of a "hot melt" liquid adhesive applicator apparatus. It will be apparent, however, to those skilled in the art of automatic control of physical processes that the invention may be utilized for the control of a variety of different physical conditions such as temperature, fluid level, pressure and the like in various process control environments, and the disclosed embodiment is exemplary only.

The hot adhesive or hot glue dispensing apparatus described herein may be employed, for example, in the fabrication or sealing of cardboard boxes or similar containers. Such an application requires a precise control of adhesive temperature and level, often at a substantial number of different locations, and the capability of changing these parameters to maximize ease of application, degree of adhesion and the like.

Referring now to the drawings, with specific reference to FIGS. 1 and 2, the exterior appearance of a temperature responsive power control unit 12 is shown in FIG. 1. Control unit 12 is provided with a vertically mounted control panel 14 and one or more flexible conduit tubes 16 extending from the unit. Internally of control unit 12 is a tank 18 (FIG. 2) suitable for containing a quantity of liquid adhesive therein. Tank 18 is provided with one or more heating elements schematically indicated in FIG. 2 at 20 for heating the liquid adhesive contained within the tank. The adhesive is placed within tank 18 through a door 22 mounted on the upper surface of control unit 12 and which provides access to the interior of the tank.

Conduit tubes 16 extend from fluid coupling 24 mounted on the exterior of control unit 12 and communicating with the interior of tank 18 to one or more remotely located liquid adhesive dispensing units 26 (FIG. 2). Fluid dispensing unit 26 is illustrated in the form of an applicator wheel 28 and associated adhesive reservoir 30 which supplies a relatively constant amount of liquid adhesive to the applicator wheel. The applicator wheel is of conventional construction and is formed with a plurality of liquid dispensing apertures in its exterior surface. Liquid adhesive supplied from reservoir 30 to the interior of applicator wheel 28 flows through these apertures onto a work surface such as a closure flap for a cardboard container positioned beneath the applicator wheel.

Liquid adhesive within tank 18 is heated by the application of electrical power to heating elements 20 supplied from control unit 12. Fluid pump 32 is provided at the discharge port of tank 18 and forces heat liquid adhesive from tank 18 to applicator wheel reservoir 30 via a solenoid-actuated flow valve 34 and conduits 16. Fluid flowing within conduits 16 is heated by the controlled application of electrical power supplied from control unit 12 to heating elements 36 which surround conduit 16.

In the depicted embodiment the various process control parameters which are to be monitored and controlled include:

A. The temperature of liquid adhesive within tank 18;

B. The temperature of liquid adhesive within conduits 16; and

C. The level of liquid adhesive within reservoir 30.

It should be noted that the temperature of liquid adhesive within wheel reservoir 30 is preferably controlled in a similar manner, and the means for accomplishing this would comprise another control channel. The construction and operation of this channel would be substantially identical to channels A and B above and a detailed description thereof is therefore omitted.

The temperature at the three control locations listed above is respectively sensed by thermocouples 40, 42 and 44. Thermocouple 40 may be mounted, for example, on the exterior of tank 18, thermocouple 42 may be located within conduit 16, and thermocouple 44 may be disposed within reservoir 30 at a vertical height therein corresponding to the desired liquid adhesive level.

As will appear more fully below, the electronic circuitry within control unit 12 receives electrical signals from thermocouples 40, 42 and 44 representing the temperatures at the corresponding control locations and selectively supplies AC current to the associated control means. This controlled application of electrical energy to heating elements 20 and 36 results in the maintenance of the liquid temperature within tank 18 and conduits 16 respectively within preselected temperature limits, while the regulation of electrical energy applied to solenoid valve 34 results in the maintenance of the volume of liquid adhesive within reservoir 30 at a desired level. This in turn provides a greater degree of control of the amount and rate of liquid adhesive applied to the work surface via applicator wheel 28.

Control panel 14 has mounted thereon a voltmeter 50 which is calibrated in degrees of temperature in such a manner as to compensate for the non-linearity of the thermocouple output. Control panel 14 also includes a rotary channel selector switch 52 adapted to be manually rotated into alignment with any one of a plurality of potentiometers 54a–54e, each one of which represents a different station or control location within the adhesive applicator apparatus at which the temperature is to be measured and controlled. For example, potentiometer 54a may be associated with the control channel responsive to thermocouple 40, potentiometer 54b with thermocouple 42, and so on for other control locations.

Potentiometers 54 provide the means for manually adjusting the desired or set-point temperature at such location. The latter operation is accomplished by manually depressing pressure switch 56 on control panel 14 to cause the meter to indicate the temperature value represented by the existing position of that one of potentiometers 54 to which channel selector switch 52 is then indexed. This potentiometer is then manually adjusted to vary the displayed electrical signal representing the set-point temperature to correspond to that desired at the control location in the selected channel as determined by the position of switch 52. When push-botton switch 56 is released, meter 50 will display the sensed temperature from the thermocouple in the selected channel.

Control panel 14 is provided with a series of indicator lights 58a–58c. Each of the indicator lights is associated with one of the control locations and is aligned with that one of potentiometers 54 which corresponds to the particular channel controlling that location. As will be described, indicator lights 58 provide a first color indication when the sensed temperature is below the preset temperature controlled via potentiometer 54 and a second color illumination when the sensed temperature is above the set point value. Control panel 14 is also provided with an ON/OFF master power control switch 60.

As mentioned above, the illustrated embodiment of the present invention includes three channels of control circuitry; (A) a tank channel which supplies electrical power to heating elements 20 to maintain the temperature of liquid adhesive within tank 18; (B) a conduit channel which supplies electrical power to heating elements 36 to maintain the temperature of liquid adhesive within conduit tube 16; and (C) a reservoir level control channel which supplies electrical power to solenoid actuated valve 34 to maintain the liquid adhesive within reservoir 18 at a prescribed level. The temperature sensing and power control circuitry for the three channels, is, with one exception to be described below, substantially identical and will now be described in connection with FIG. 3.

As illustrated in FIG. 3, the output from a particular one of thermocouples 40, 42 or 44 is connected across a pair of input terminals 62. The thermocouple output signal appearing across terminals 62 is supplied via input resistor 64 and parallel filter capacitor 66 to the positive (non-inverting), input terminal of integrated circuit DC sensor smplifier 70. Automatic cold junction temperature compensation and thermocouple break protection is provided by a network including thermistor 68 which is connected between positive DC power supply line 72 and the junction. of resistors 74 and 76. The other side of resistor 74 is connected to the negative DC power supply line 78 while the other side of resistor 76 is connected to ground.

A voltage divider is formed with respect to the non-inverting (+)input of amplifier 70 by the combination of input resistor 64 and resistors 80 and 82. Resistor 80 is connected between the positive input of amplifier 70 and positive DC supply line 72, while resistor 82 is connected between this input of amplifier 70 and the junction of resistors 74 and 76. The negative (inverting) input terminal of amplifier 70 is connected to ground through the resistance element of potentiometer 84, the movable contact or wiper of which is connected to the output of amplifier 70 through feedback resistor 86. Thus connection provides adjustable negative feedback for amplifier 70.

Power supply lines 72 and 78 are connected across the amplifier to energize the same and the offset voltage of the amplifier is adjustable by a potentiometer 88 resistively coupled across the offset voltage terminals of amplifier 70 and having the movable contact thereof connected to negative DC supply line 78.

Sensor amplifier 70 and the connections described above provide signal amplification of the thermocouple input applied to terminals 62 to produce at the output of the amplifier an amplified sensor signal representing the temperature at the particular control location monitored by the control channel shown. The circuit of FIG. 3 also includes the means for generating the set-point signal representing the desired temperature at the thermocouple location as follows.

The circuitry which generates the signal representing the set-point temperature includes an integrated circuit DC set-point amplifier 90 connected between DC power supply lines 72 and 78 for energization thereof. Amplifier 90 has its positive (non-inverting) input terminal connected via input resistor 92 to the movable element of potentiometer 94 which controls the set-point temperature for the channel under discussion.

One end of the resistance element of potentiometer 94 is connected to ground via resistor 96 while the other end of the resistance element of potentiometer 94 is connected to the positive DC supply line 72 via an adjustable resistor arrangement 98. The negative (inverting) input terminal of amplifier 90 is connected to ground through the resistance element of potentiometer 100, the movable contact of which is connected to the output of amplifier 90 via feedback resistor 102. This provides negative feedback control of amplifier 90 in a manner similar to that discussed in connection with amplifier 70. Also the offset voltage of amplifier 90 is adjustable via potentiometer 104 in the same manner as discussed above in connection with amplifier 70. Sensor amplifier 70 and set-point amplifier 90 may be identical integrated circuit amplifiers such as model number LM-741 manufactured by National Semiconductor.

In the case of the control channels which maintain a preselected fluid temperature at a control location — e.g., channels A and B controlling heating elements 20 and 36 respectively — potentiometer 94 in FIG. 3 which controls the set-point temperature input to amplifier 90 corresponds to the associated one of potentiometers 54a and 54b shown in FIGS. 1 and 2. These potentiometers are preferably mounted on control panel 14 as shown in FIG. 1 and this remote location is indicated in FIG. 3 by the broken lines. Alternatively, these potentiometers may be located locally with the circuitry of the associated control channel.

It will be seen that by varying the position of the movable contact of potentiometer 94 the signal applied to set-point amplifier 90 will be varied with a consequent change in the amplifier output signal. The output of amplifier 90 is applied to a set- point temperature terminal 106 via output resistor 107. This signal is also applied to the negative (inverting) input terminal of comparator amplifier 110. In a similar manner the output signal from temperature sensor amplifier 70 is applied via output resistor 109 to a sensor output terminal 108 and to the positive (non-inverting) input terminal of comparator amplifier 110. Either of the signals appearing at terminals 106 and 108 may be selectively applied to meter 50 to indicatethe temperature corresponding to the amplitude of the signal present at that terminal.

In operation of the control panel 14 with channel selector switch 52 indexed to the particular channel shown in FIG. 3 the sensor temperature signal at terminal 108 (representing the temperature of the control location whose thermocouple is connected across input terminals 62) will be displayed on meter 50. Depression of pressure switch 56 on control panel 14 will disconnect terminal 108 from meter 50 and connect terminal 106 thereto so that the meter then indicates the set-point temperature corresponding to the output signal from amplifier 90. The set-point temperature is readily varied by adjusting the set-point potentiometer 94 for the selected channel (i.e., potentiometer 54a or 54b) with switch 56 depressed until the output of amplifier 90 is appropriate to cause meter 50 to read the desired set-point temperature.

In the case of control channel C which maintains fluid level within reservoir 30, the set-point temperature signal input to amplifier 90 need not be derived from an independently adjustable one of potentiometers 54 as was the case with control channels A and B. This results from the fact that the desired value of the condition controlled by channel C — i.e, the temperature at thermocouple 44 — may be sufficiently related to the set-point temperature value of another channel to allow a slaved control. For example, in the illustrated embodiment the channel C set-point temperature may be slaved the the channel B set-point temperature if the temperature of liquid adhesive within reservoir 30 is close enough to the temperature of liquid adhesive within conduit 16. In this case, potentiometer 94 in the control circuit of FIG. 3 for channel C will correspond to potentiometer 54b on control panel 14 which provides the set-point temperature value for channel B. This particular manner of deriving the channel C set-point signal is more clearly shown in FIG. 5. Alternatively, the channel C set-point temperature input may be slaved to the set-point potentiometer for a channel which controls reservoir adhesive temperature directly as discussed above. Finally, the fluid level set point signal may be controlled by a separate potentiometer where process control requirements so dictate.

The signals from sensor amplifier 70 and set-point amplifier 90 are applied to the two inputs of comparison amplifier 110 as described above. The positive (non-inverting) and negative (inverting) input terminals comparison amplifier 110 are respectively biased above ground by resistors 114 and 118.

Feedback for amplifier 110 is provided by variable resistor arrangement 120 which is connected between the output of amplifier 110 and its negative input and resistor 122 which is connected between the amplifier output and its positive input terminal. Adjustment of offset voltage of amplifier 110 is accomplished via resistively coupled potentiometer 116 in the same manner as with amplifiers 70 and 90 and amplifier 110 is also connected across power supply lines 72 and 78 for energization in a like manner.

Amplifier 110 operates as a voltage comparator to compare the output signals of amplifiers 70 and 90 and to produce a positive ornegative difference output depending on the relative magnitude of the input signals. Comparator amplifier 110 is preferably operated to produce a positive output voltage when the input voltage from sensor amplifier 70 applied to the positive input terminal of amplifier 110 exceeds the input voltage from set-point amplifier 90 which is applied to the negative input terminal of amplifier 110.

The output of amplifier 110 is coupled through a voltage divider comprising series resistors 124 and 126 to the negative DC supply line 78. The junction of resistors 124 and 126 is connected to the base of a PNP transistor 128 having its emitter grounded and its base connected to the emitter through resistor 130. The collector of transistor 128 is coupled through a resistor 132 to control circuit output terminal 134. A second control circuit output terminal 136 is connected to the negative DC supply line 78 via resistor 138.

A negative signal at the output of amplifier 110 provides base drive current for transistor 128 to turn on the transistor and provide a control signal to power switching circuitry (shown in FIGS. 4A–4B) connected across putput terminals 134 and 136. Resistors 132 and 138 are used to limit the amount of output current flowing through the collector of transistor 128.

Thermocouple break protection is accomplished in the control circuit of FIG. 3 by drastically raising the input voltage supplied to sensor amplifier 70 upon any open circuit of the thermocouple connected across terminals 62. In this respect it is noted that the resistance of the thermocouple is normally less than 10 ohms and thus, with input resistor 64 having a resistance of about 100 ohms, the normal source resistance will be in the range of from 100 to 110 ohms. Open circuiting the thermocouple thus drastically increases the amplitude of the positive voltage appearing at the positive input terminal of amplifier 70 driving the amplifier output extremely positive. This in turn biases the positive input terminal of comparator amplifier 110 extremely positive causing its output to be positive which cuts off transistor 128 and disconnects all power to the load (control device) in that channel.

The output of amplifier 110 is also used to operate that one of alarm indicator lights 58a–58e on control panel 14 which is associated with the control channel under discussion. The exact manner of connection for such operation may vary according to the type of indicator lights employed. One arrangement may employ as indicator lamp 58, a two-color light emitting diode (LED) which emits a green light when current flows through the diode in one direction and a red light when current flows through the diode in the opposite direction. With one side of the LED grounded, the light color is changed by a reversal of the polarity of voltage applied to the other side of the LED, which is connected to the circuit of FIG. 3. Such a polarity reversal occurs at the output of amplifier 110 when the input signals thereto reverse in relative magnitude. Resistor-diode arrangement 140 connects the output of amplifier 110 to alarm indicator terminal 142 which is connected to the non-grounded side of the LED.

The parallel diodes of circuit 140 provide a small voltage drop in the area of 0.6 volts in either direction so that no current will flow through the LED when the sensor temperature and set-point temperature are equal or close to equal. A characteristic of one type of LED that may be employed herein is that more current must flow through the diode in one direction than in the opposite direction for an equal level of light emission. This condition is herein accomodated by the parallel diode resistor arrangement 140 for it will be seen that current in one direction will flow through two diodes and a resistor, but current in the other direction will flow through one diode and two resistors. The LED alarm indicator lamp 58 will thus glow green when the sensor temperature is less than the set-point temperature by a predetermined amount, will glow red when the sensor temperature is greater than the set-point temperature by a predetermined amount, and will not be illuminated at all when these two temperatures are equal or within a predetermined range of each other.

The control signal appearing across output terminals 134 and 136 of the control circuitry shown in FIG. 3 is applied to the channel power switching circuitry as follows. FIGS 4A and 4B illustrate the preferred implementation of power switching circuitry which is responsive to the drive signal appearing at the output terminals 134 and 136 of the control circuitry of FIG. 3. FIG. 4A illustrates the type of switching circuit which supplies AC power to a resistive load such as heating elements 20 or 36, while FIG. 4B illustrates a switching circuit of the same general type for applying AC power to an inductive load such as solenoid actuated control valve 34. Those elements of the power switching circuits of FIGS. 4A and 4B which are identical will be designated by the same reference numeral, while those portions of the two circuits which are dissimilar will be so indicated.

Output terminals 134 and 136 of the control circuitry for the channel illustrated in FIG. 3 are connected to the input of an optical coupler 160. Optical coupler 160 is schematically illustrated in FIGS. 4A and 4B as incorporating a light emitting diode 162 and a light responsive phototransistor 164 which is turned on when diode 162 conducts and emits light. It will be seen that this unit provides optical coupling into the power switching circuit to thus provide complete electrical isolation of the control circuit of FIG. 3 from the power switching circuits of FIGS. 4A and 4B.

One output terminal of optical coupler 160 is connected through resistor 166 to the inhibit input, terminal no. 1, of an integrated circuit switch 170. Switch 170 is a conventional integrated circuit which is commercially available and in order to facilitate understanding of the present invention the terminals of this switch are labeled in FIGS. 4A and 4B with the same numerals as appear on integrated circuit no CA3059 manufactured by Radio Corporation of America. Similar integrated circuits available from other manufacturers may be utilized to serve the same function as described herein.

Switch 170 incorporates an internal DC power supply allowing it to be employed directly with an AC line. The two sides of a single phase AC power line are illustrated as originating from terminals 172 and 174. Terminal 172 will be assumed to be connected to the ungrounded or "power" side of the external AC line while terminal 174 corresponds to the grounded or "neutral" side of the external AC line. Terminals 172 and 174 are connected to internal AC lines 176 and 178 respectively.

AC power line 176 is connected to input terminal no 5 of switch of 170 through current limiting resistors 180 and 182. Input terminal no. 2 provides DC output from switch 170 over line 184. This DC output is used to bias input terminals nos. 1 and 13 of switch 170, as well as supply operating current for phototransistor 164. DC bias for switch input terminal no. 1 is controlled by resistor 186, while the signal applied to input terminal no. 13 is controlled by a voltage divider comprising resistor 188 and thermistor 190. Thermistor 190 is physically attached to the heat sink (to be described in connection with FIG. 6) on which the power switching circuitry of FIGS. 4A and 4B are mounted and allows transmission of AC power to the load associated with the corresponding channel to be disconnected in the event the power switching element approaches thermal runaway due to inadequate heat dissipation therefrom.

If such a condition occurs, the positive DC voltage at input terminal no. 13 of switch 170 will decrease to a level where the switch output will be cut off, causing the transmission of AC power to the load controlled by that switch to be interrupted.

DC line 184 is connected to neutral AC line 178 via capacitor 192 and various terminals of switch 170 are connected to the neutral AC line as follows. Terminal no. 7 is connected directly to neutral line 178. Terminal no. 8 is connected to neutral line 178 through resistor 194. Terminal no. 12 is connected to neutral line 178 through resistors 194 and 196. Terminal no. 4 is connected to neutral line 178 through resistor 198. These connections result in switch 170 acting as a zero voltage switch which functions as follows.

When an input signal from optical coupler 160 is applied to input terminal no. 1 of switch 170 which is biased above ground by resistor 186, an output pulse will appear at output terminal no. 3 of the switch corresponding in time to the point in the AC waveform when the voltage between both sides of the line is zero — i.e., to the zero voltage crossing of the AC line. By the use of zero voltage switching the power supplied to the load is switched on only as the waveform of the AC voltage passes through zero. This eliminates current surges in the load and consequently greatly increases the life of the load. Zero voltage switching as herein employed also eliminates radio frequency interference which may otherwise be associated with high power switching. The control pulse from output terminal no. 3 of integrated circuit switch 170 is employed to regulate the supply of AC power to a control means effecting the condition sensed and controlled by the particular channel under discussion. In the case of the power switching circuitry shown in FIG. 4A, such control means constitute resistive loads such as heating elements 20 and 36 (see FIG. 2).

In the circuit illustrated in FIG. 4A it is considered that a split resistive load is to be energized with such load comprising heating element 202 and 204. These heating elements may correspond, for example, to tank heating elements 16 or conduit heating elements 36 as illustrated in FIG. 2. One end of heating element 202 is connected to AC power line 176 and the other end is connected to AC neutral line 178 through thyristor 206. In a similar manner, heating element 204 is connected between power line 176 and neutral line 178 through thyristor 208.

The AC power is gated through thyristors 206 and 208 by the output signal from terminal no. 3 of switch 170. This control signal is supplied through output resistor 200 and parallel coupling capacitors 210 and 212 to thyristors 206 and 208 respectively.

The thyristors are cut off each time that zero current appears across them — i.e., twice each cycle of AC voltage — and thus are turned on twice each cycle by a control pulse from the switch output for as long as the AC signal remains near the zero voltage point. As noted above, the particular integrated cirucit employed as switch 170 has an internal DC power supply circuit which will produce a limited output drive current at terminal no. 3. Thus, for circuits requiring a greater output drive current it is possible to incorporate an external power supply which will supply a larger current pulse and allow the use of larger current handling thyristors.

Referring now to FIG. 4B, a power switching circuit for an inductive load 224 is illustrated with those portions thereof that are essentially identical to those of FIG. 4A designated by the same reference numeral with the suffix a added. Load 224 may correspond, for example, with the solenoid of flow valve 34 (see FIG. 2). In addition to the nature of the load, the essential differences in the circuit of FIG. 4B are in the elimination of resistive coupling of terminals nos. 7, 8 and 12 to neutral power line 178a and in the derivation of the switch output signal from terminal no. 4. The power switching control signal from switch output terminal no. 4 is supplied to the gate input of switching thyristor 220 via output resistor 222. Inductive load 224 is connected between the two sides of the AC line through thyristor 220. With these connections, switch 178 does not function as a zero voltage switch. This is required since, with an inductive load, the current lags the voltage by 90° and zero switching would not be appropriate.

Referring now to FIG. 5 a systems diagram for the three control channels discussed above is illustrated. Tank temperature control circuit 230A, conduit temperature control circuit 230B and reservoir level control circuit 230C all correspond to the circuit shown in FIG. 3.

Tank temperature circuit 230A outputs a control signal whenever the temperature sensed by thermocouple 40 falls below the set-point value as determined by potentiometer 54a (corresponding to potentiometer 94 in FIG. 3). When such a condition occurs a control pulse is supplied to power switch 240A via lines connected to output terminals 134 and 136 of control circuit 230A. This gates AC power on lines 176 and 178 to the load for channel A which comprises heating elements 20. At the same time an alarm signal appears at control circuit output terminal 142 and is supplied to alarm indicator LED 58a to provide a visible indication of temperature variation from the set-point value. If rotary switch 52 is indexed to position 52a (corresponding to the tank channel) the amplified sensor signal from thermocouple 40 appearing at control circuit output terminal 108 is supplied to meter 50 via push-button switch 56 in its normal undepressed position. If push-button switch 56 is manually depressed the amplified set-point temperature signal derived from potentiometer 54a appearing at control circuit output terminal 106 is supplied to meter 50 to facilitate adjustment thereof.

Referring now to Channel B, the conduit temperature control channel, shown in FIG. 5, conduit temperature control circuit 230B receives sensor input signals from conduit thermocouple 42 via input terminals 62' and set-point input signals from potentiometer 54b. When the sensed temperature value falls below the set-point temperature value a control pulse appears at control circuit output terminals 134' and 136' and is supplied to power switch 240B. This connects AC power lines 176 and 178 to the channel B load which comprises heating elements 36. At the same time control circuit 230B supplies an alarm signal to alarm indicator LED 58b via output terminal 142'.

Referring now to control channel C which maintains fluid level within reservoir 30, reservoir level control circuit 230C receives a sensor input signal from thermocouple 44 at input terminals 62''. When the level of the heated liquid within reservoir 30 drops to cause the temperature sensed by thermocouple 44 to fall below the set-point value, circuit 230C supplies a control pulse to output terminals 134'' and 136''. This control pulse is applied to power switch 240C to gate AC power on lines 176 and 178 to the load for channel C which is inductive and comprises the solenoid actuator of valve 34. Energization of the solenoid will open the valve permitting fluid to flow from tank 18 to reservoir 30 via conduits 16. When the fluid in the reservoir reaches the desired level, the sensed temperature will approach the set point value interrupting the control signal from comparison amplifier 110 and closing the valve.

It will be noted that reservoir level channel C does not include provision for visual alarm indication or display of the set-point temperature value on meter 50. As discussed above, the set-point temperature signal for channel C is derived directly from the set-point potentiometer 54 on control panel 14 associated with another channel. In the arrangement depicted the set-point input for channel C is slaved to potentiometer 54b which controls the set-point temperature for channel B. Alternatively, the set-point input signal for the reservoir level control channel could be derived from the set-point potentiometer for a channel controlling the temperature of the reservoir contents. It will be apparent that resistive power switches 240A and 240B correspond to the circuit of FIG. 4A above, while inductive power switch 240C corresponds to the circuit shown in FIG. 4B.

It will be noted with respect to the above described embodiment that the various channel power switches may dissipate a considerable amount of heat under certain circumstances so that difficulty could arise in a tightly packaged unit. Control unit 12 is made as small as possible and, in particular, the control panel 14 and the volume behind it containing the pulse circuitry, power switches, and power supply is made as small as possible for convenience in use thereof.

It is therefore provided herein that the control circuitry for the various channels discussed above are physically embodied as printed circuit boards with elements mounted thereon and such printed circuit boards are mounted so as to provide maximum heat dissipation. With specific reference to FIG. 6 there is illustrated a printed circuit board 260 mounted in a metal frame 262 having interior vertical grooves 264 in which board 260 is slid vertically downwardly into the frame. For example, circuit board 260 may comprise the control and power switching circuitry of a particular channel.

Frame 262 comprises a heat sink and heat radiator and may be provided with external fins 266 to enhance the removal of heat from the interior thereof. The thyristor power switches such as 206 and 208 for the various channels are the major heat radiating elements of the circuitry and these are physically mounted directly to frame 262 and are vertically located so that the power switching circuit carrying the highest load current is about 25-30 percent of the frame height from the bottom of the frame.

Actual conduction within the frame itself results in heat rising from these units and, thus, it has been found that their location nearer to the bottom of the frame enhances and improves the removal of heat by the heat sink while direct attachment to the frame maximizes conduction. In as much as the present invention is capable of a rather large range of power control without requiring a large or overall housing or frame, it is of substantial importance that maximum heat removal from the interior of the frame be accomplished without unduly complicating the overall structure by addition of fans or the like. The particular location of the major heat radiating elements at a height of about 25-30 percent of the vertical height of the frame or heat sink has been found to be highly advantageous in this respect.

The present invention as described above with respect to a particular preferred embodiment thereof and exemplary application will be seen to provide a very precise condition control having a wide degree of capabilities to thus commend the invention to wide-spread commercial application. Although the invention has been described with respect to a single preferred embodiment it is not intended to limit the invention to the exact terms of description or details of illustration and it will be apparent to those skilled in the art that modifications and variations in the disclosed structure and circuitry may be made within the scope of the present invention.

What is claimed is:

1. A control system comprising:
a sensor producing electrical signals representing a controllable physical condition;
a circuit including a first integrated circuit feedback amplifier having an input connected to said sensor for amplifying said sensor signals and a second like integrated circuit feedback amplifier having an input potentiometer connected across a power supply for adjusting the input thereto for producing set condition signals;
a meter selectively connected to receive and display said amplified sensor signals and said set condition signals in terms of the condition to be controlled;
a comparator comprising a third integrated circuit feedback amplifier connected to receive said amplified sensor signals and said set condition signals and producing a difference signal therefrom;
a switch connecting a power supply and an operator for affecting the condition to be controlled; and
an optical coupler applying said difference signal to control means of said switch for operating the switch to control said condition.

2. The control system of claim 1 further defined by said power supply comprising an alternating current power supply and
said switch comprising a zero voltage switch whereby said power supply is only switched at the phase condition of zero voltage therefrom.

3. The control system of claim 1 further defined by said sensor comprising a thermocouple for producing signals related to temperature,
said first amplifier having a thermistor in an input circuit thereof connected to said thermocouple, and
said meter comprising a voltmeter having a visually observable indicator calibrated in degrees of temperature and indicating an adjustable set temperature at the thermocouple.

4. The system of claim 1 further defined by said sensor comprising a thermocouple, a voltage divider connected across the input of said first amplifier and a biasing circuit including a thermistor connected to bias said voltage divider for cold junction compensation of said thermocouple.

5. The system of claim 1 further defined by said sensor having a low electrical resistance and a voltage divider connected across a power supply and to the input of said first amplifier for applying a very different input signal thereto upon sensor failure.

6. A control system for automatically controlling a physical condition at a plurality of locations comprising
a sensor disposed at each of said locations responsive to a condition to be controlled and producing electrical signals related to such condition;
a plurality of channels having a sensor connected to the input of each and each including first, second and third amplifiers with the associated sensor connected across the first amplifier to produce a channel sensor signal and a potentiometer connected across the second amplifier to produce an adjustable channel set signal, said third amplifier being connected to receive said sensor and set signals to produce a difference signal therefrom and channel switching means coupled to said third amplifier for controlling an operator effecting said physical condition at the location of the channel sensor;
a meter; and
system switching means including a first selector switch connecting said meter to a selected channel and a two position switch for each channel to connect either said channel sensor signal or channel set signal to said meter,
whereby the set signal for each channel may be adjusted as indicated by said meter to the desired location condition and such condition is then automatically maintained.

7. An adjustable automatic temperature control system
comprising at least one thermocouple adapted for placement of a sensing end thereof at a location for temperature control and producing signals at an output end thereof related to the actual temperature at said location.
a first amplifier having an input circuit connected to the output end of said thermocouple and producing an amplified thermocouple signal,
a second amplifier having an input potentiometer connected across a power supply to apply a controllable input signal thereto,
a meter connected through a selector switch to the outputs of said first and second amplifiers for selectively displaying the amplifier output signals as temperatures whereby the second amplifier output is adjustable to represent a desired temperature at said location,
a comparator connected to the outputs of said amplifiers and producing a difference signal therefrom,
an electronic switch connecting a power supply to heating coils disposable in proximity to said location for energizing the heating coils in response to switch actuation, and
an optical coupler connecting the difference signals from said comparator to said switch for controlling actuation thereof to control the temperature at said location by controlling heating by said coils.

8. The system of claim 8 further defined by
said first and second amplifiers and said comparator comprising like integrated circuit amplifiers,
a transistor coupling the output of said comparator to said optical coupler, and
said electronic switch including a zero voltage switch operated by said optical coupler and controlling at least one thyristor connecting said power supply and heating coils.

9. The system of claim 8 further defined by
a heat conduting frame mounting said amplifiers, coupler and electronic switch with said thyristor being directly attached to said frame at 25 to 30 percent of the vertical height thereof from the bottom of the frame.

10. A multi-channel electronic control system responsive to the temperature at each of a plurality of process control locations, each of said channels being associated with a corresponding one of said control locations and individually comprising:
a thermocouple at said associated control location for generating electrical output signals representative of the monitored temperature thereat;
control means for affecting a controllable physical condition associated with the monitored temperature at said control location;

first control circuit means responsive to said thermocouple output signals for amplifying said signals to generate a sensor signal therefrom;

second control circuit means repsonsive to manual adjustment to generate a selectively variable set-point signal representative of the desired temperature at said monitored control location;

third control circuit means responsive to said sensor signal from said first circuit means and to said set-point signal from said second circuit means for comparing said signals to generate a difference signal therefrom;

power switching circuit means responsive to said difference signal to selectively supply alternating current electrical power to said control means when said difference signal exceeds a predetermined value; and means for selectively displaying said sensor signals and said set point signals for a selected one of said channels.

11. The control system of claim 10 wherein said control means further comprise electrothermal transducer means.

12. The control system of claim 11 wherein said electrothermal transducer means further comprise resistive heating elements.

13. The control system of claim 12 wherein said power switching circuit means includes a zero voltage switch whereby electrical power is supplied to said heating elements only during the period of the AC cycle when the voltage component thereof is near zero.

14. The control system of claim 10 wherein said control means further comprise electromechanical transducer means.

15. The control system of claim 14 wherein said electromechanical transducer means further comprises at least one solenoid actuated fluid flow valve.

16. The control system of claim 10 further comprising electrical isolation means between said control circuit means and said power switching circuit means.

17. The control system of claim 16 wherein said electric isolation means further comprises an optical coupler.

18. The control system of claim 10 wherein said selective display means further comprises a voltmeter having a visually observable indicator calibrated in degrees of temperature.

19. The control system of claim 10 wherein said first control circuit means includes a thermistor associated with the input thereof to compensate for cold junction effects on said thermocouple output signal.

20. The control system of claim 10 wherein said second control circuit means includes a manually adjustable potentiometer for selective variation of said set-point signal.

21. The control system of claim 10 further comprising visual alarm means for indicating deviation of the magnitude of said sensor signal from said set-point signal by a predetermined amount.

22. The control system of claim 21 wherein said visual alarm means further comprises a light emitting diode exhibiting a first color illumination when said sensor signal exceeds said set-point signal by a predetermined amount and a second color illumination when said sensor signal falls below said set-point signal by a predetermined amount.

23. The control system of claim 10, wherein said first and second control circuits respectfully comprise first and second like integrated circuit feedback amplifiers, said first amplifier having an input connected to receive said thermocouple output signal and said second amplifier having an input connected to a mannually adjustable potentiometer, and wherein said third control circuit further comprises a third integrated circuit feedback amplifier, one input of which is connected to receive the output of said first amplifier and the other input of which is connected to receive the output of said second amplifier.

24. In liquid adhesive dispensing apparatus of the type having a tank for containing a quantity of liquid adhesive, an applicator for dispensing said adhesive onto a work surface and adhesive supply means connecting said tank and said applicator, the improvement comprising an electronic multi-channel control system responsive to adhesive temperature at a plurality of thermal flow locations including said tank, said supply means and said applicator, wherein each channel of said control system is associated with one of said thermal flow locations and further comprises:

a. a thermocouple at the associated thermal flow loaction for monitoring the temperature thereat and generating an electrical output signal representing said monitored temperature;

b. a control circuit for comparing said thermocouple output signal with a manually adjustable set-point signal representing the desired temperature at said thermal flow location to generate a control signal therefrom whenever the relative magnitude of said thermocouple signal and said set-point signal exceeds a predetermined amount;

c. control means affecting the monitored temperature at said thermal flow location; and d. an electronic power switch responsive to said control signal to supply electrical power to said control means upon receipt of said control signal.

* * * * *